United States Patent [19]
Montgomery et al.

[11] Patent Number: 6,088,925
[45] Date of Patent: Jul. 18, 2000

[54] CAPTURE FEATURE TANG SEAL DEFECT MEASUREMENT TOOL

[75] Inventors: Ronald B. Montgomery, Layton; M. Bryan Ream, Farmington, both of Utah

[73] Assignee: Cordant Technologies Inc., Salt Lake City, Utah

[21] Appl. No.: 09/086,572

[22] Filed: May 29, 1998

Related U.S. Application Data

[60] Provisional application No. 60/074,212, Feb. 10, 1998.

[51] Int. Cl.[7] ........................................ G01B 5/00
[52] U.S. Cl. ............................ 33/833; 33/710; 33/522
[58] Field of Search ........................... 33/710, 711, 832, 33/833, 522, 545–546, 549–555

[56] References Cited

U.S. PATENT DOCUMENTS

| | | | |
|---|---|---|---|
| 3,045,510 | 7/1962 | Brainard | 33/710 |
| 3,473,227 | 10/1969 | Franklin | 33/710 |
| 5,313,714 | 5/1994 | Nakao | 33/522 |
| 5,570,514 | 11/1996 | Hashimoto et al. | 33/833 |

*Primary Examiner*—Diego Gutierrez
*Assistant Examiner*—Quyen Doan
*Attorney, Agent, or Firm*—Pillsbury Madison & Sutro LLP

[57] ABSTRACT

An apparatus for measuring seal defects on a seal surface of a rocket motor case field joint is provided. The apparatus includes a base mountable onto the rocket motor case field joint. The base is sweepable circumferentially along the field joint. An axial sweeping mechanism is disposed on the base and is sweepable axially along the case field joint. A measurement probe for measuring the depth of the seal defect is disposed on the axial sweeping mechanism.

1 Claim, 8 Drawing Sheets

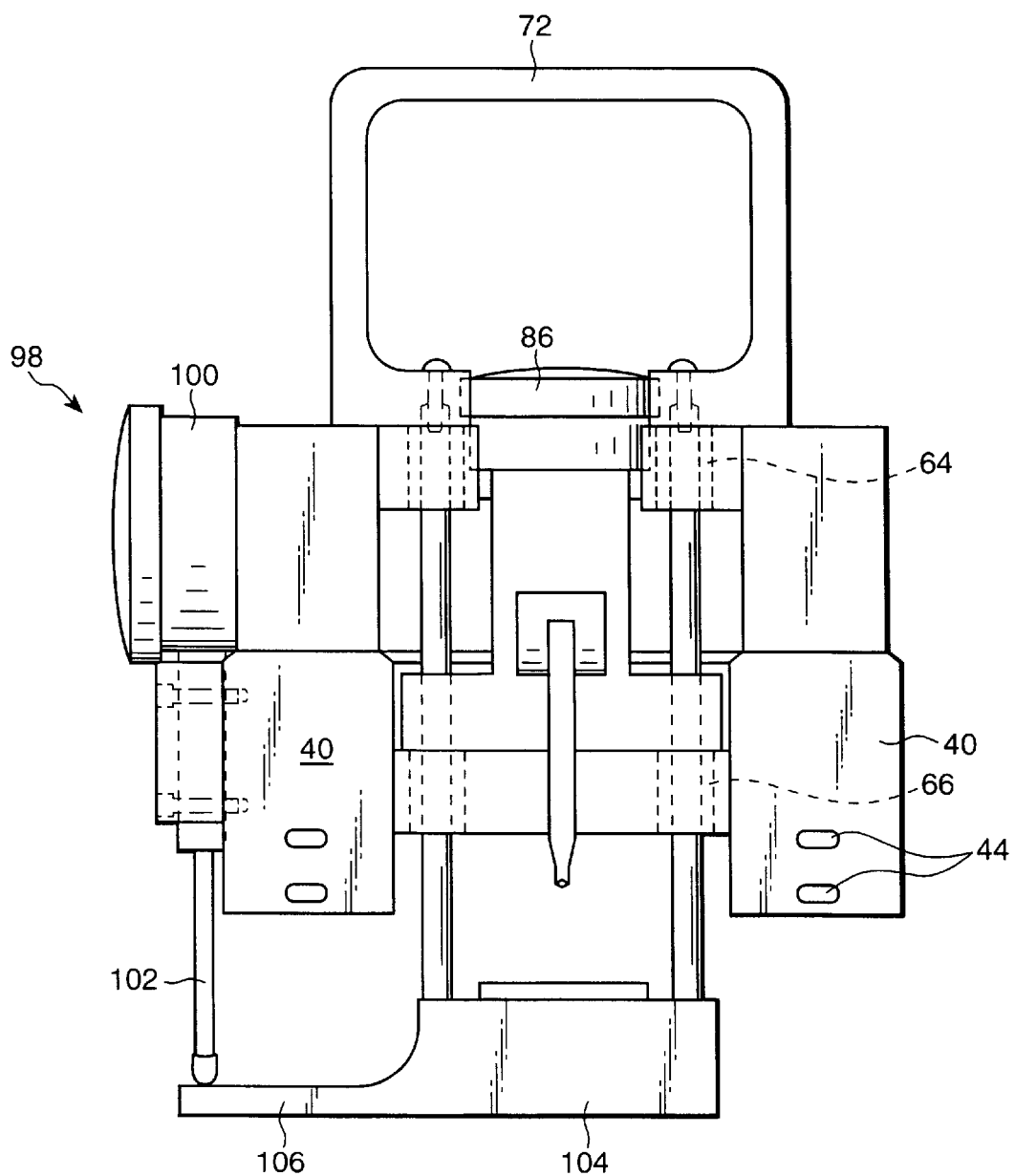

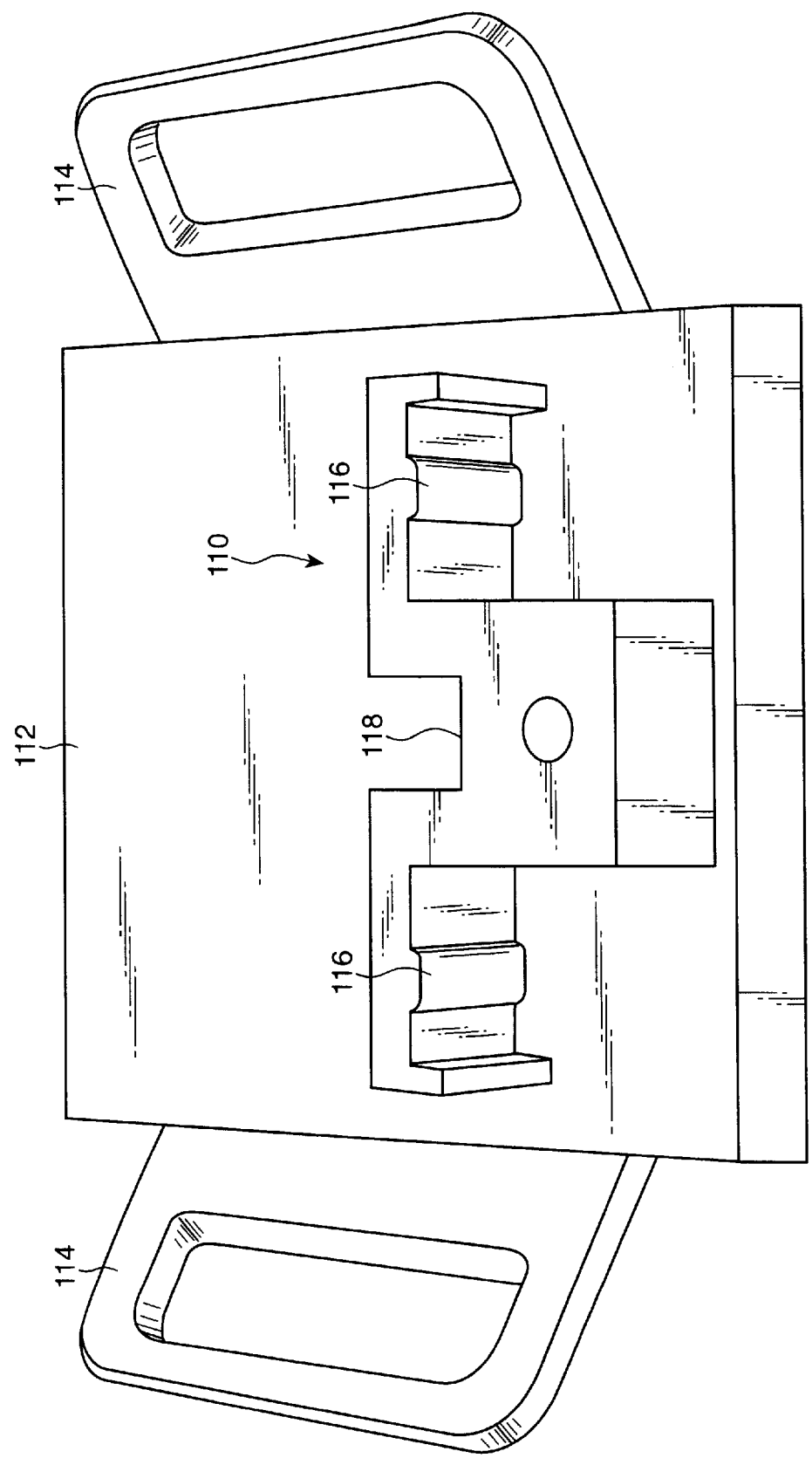

CAPTURE FEATURE TANG SEAL DEFECT MEASUREMENT TOOL

This application claims benefit to U.S. provisional application 60/074,212 filed Feb. 10, 1998.

BACKGROUND OF THE INVENTION

The present invention relates to an apparatus for measuring seal defects on the seal surface of a capture feature tang of a rocket motor case field joint. In particular, the present invention can be used to measure the depth of defects (or repairs to such defects) in the seal surface of a rocket motor casing caused by the firing of the rocket motor.

Rocket motor casings can be refurbished and reused after firing. The seal surface of a rocket motor after firing, however, typically becomes pitted and/or scarred. Thus, before the rocket motor casing can be reused, these defects must be repaired by smoothing out, or blending, the defects into the surrounding seal surface. The depth of these "blend zones" must be less than a specified engineering maximum to ensure proper sealing of the rocket motor case field joint.

More particularly, a case field joint of a rocket motor includes an annular clevis joint and a mating annular tang joint. The interface between the clevis joint and the tang joint must be sealed against the internal pressure generated inside the motor casing when the rocket motor is fired. As shown in FIG. 1, to accomplish this sealing, the tang joint 10 includes a capture feature 12 spaced from a tang 14. The capture feature 12 is sealed against the clevis joint with a capture feature O-ring. The tang 14 includes a tang seal surface 16 upon which primary and secondary clevis joint O-rings are seated to completely seal the clevis joint to the tang joint.

A capture feature gap 18 is defined as the space between the capture feature 12 and the tang 14. The width of the capture feature gap 18 is measured from the interference fit diameter surface 20 (the interior surface of the capture feature 12) to the seal surface 16. The interference fit diameter surface 20 is the engineering datum from which the capture feature gap 18 is measured and is typically unaffected by rocket firing.

To ensure proper sealing between the clevis joint and the tang joint, the capture feature gap 18 cannot exceed a specified engineering maximum. As discussed above, rocket firing can scar the tang seal surface, thereby effectively increasing the depth of the capture feature gap 18.

Before the rocket motor can be reused, the tang seal surface 16 must be refurbished. In that regard, the scars and/or pitting in the seal surface are blended out with a grinding tool into a blend zone 22. Every defect in the tang seal surface 16 must be blended out to an area 30 times the depth of the defect. It would not be unusual for the tang seal surface 16 to have hundreds of blend zones, including overlapping blend zones, after refurbishment.

After refurbishment and before the rocket motor casing can be returned to service, the depth of the blend zones must be measured to determine whether the capture feature gap 18 including the depth of the blend zone 22 exceeds the engineering maximum.

Heretofore, the depth of blend zones was measured using a bore micrometer. In this process, the bore micrometer was first calibrated against a known bore of a ring gauge. Once calibrated, the capture feature gap 18 was measured with the bore gauge at an area of the tang seal surface 16 unaffected by blend zones. With that measurement, the unaffected capture feature gap 18 was determined by adding the bore gauge measurement from the known diameter of the ring gauge.

Once the depth of an unaffected capture feature gap 18 was determined, the depth of the gap at a blend zone was determined by using a "horseshoe gauge." The "horseshoe gauge" comprises a known dial indicator disposed on a C-shaped bracket. The "horseshoe gauge" was first zeroed-out at an unaffected area on the tang seal surface adjacent to a blend zone. Once zeroed, the "horseshoe gauge" was moved to the blend zone to determine the depth of the blend zone. The overall capture feature gap was determined by adding the unaffected capture feature gap to the depth of the blend zone.

The foregoing technique presented several problems. First, the accuracy of this procedure depended upon the operator keeping the bore micrometer and "horseshoe gauge" square to the tang seal surface. If measurements were made at an angle, errors were introduced into the measurement.

Second, this procedure depends upon finding an unaffected area on the tang seal surface. As stated above, however, the tang seal-surface can be covered with hundreds of blend zones, making it extremely difficult to accurately identify an unaffected area of the tang seal surface.

SUMMARY OF THE INVENTION

The present invention addresses the disadvantages of the foregoing measurement technique. The present invention solves the foregoing problems by providing a tool capable of directly measuring the depth of the capture feature gap without the need to first locate and measure the width of the capture feature gap at an unaffected area of the tang seal surface. The present invention also provides a tool capable of sweeping both circumferentially and axially along the tang seal surface while ensuring that the tool remains square to the seal surface to provide accurate measurements of the capture feature gap. Finally, the present invention provides a tool which indexes off an engineering datum on the rocket motor case field joint. As discussed above, this engineering datum can be the interference fit diameter surface.

More particularly, the apparatus comprises a base which is mountable onto the circumferential datum surface or interference fit diameter surface of the rocket motor case field joint at a position adjacent to the tang seal surface. The base is constructed and arranged to be circumferentially movable along the circumferential datum surface while being axially and radially fixed relative to that datum surface. As configured, the base provides an extension of the engineering datum surface. Accordingly, the capture feature gap can be accurately measured from the base.

The present invention also includes an axial sweeping mechanism disposed on the base. The axial sweeping mechanism includes a supporting member disposed on the base and an axial sweeping member movably disposed on the supporting member. The axial sweeping member is configured to move axially relative to the case field joint when the base is mounted to the datum surface. The axial sweeping mechanism is constructed and arranged to confine the axial sweeping member to move along an axis parallel with the datum surface, or interference fit diameter surface, such that the axial sweeping member is radially fixed relative to the datum surface. This feature in conjunction with the base ensures that the axial sweeping mechanism remains square to the tang seal surface.

Finally, the present invention includes a measurement probe fixed to the axial sweeping member. The measurement probe is constructed and arranged to measure the distance from the circumferential datum surface of the rocket motor case field joint to the tang seal surface. The measurement probe can measure the distance from any point on the seal surface to the datum surface when the measurement apparatus is mounted to the datum surface by circumferentially moving the base to a desired circumferential position and moving the axial sweeping member to a desired axial position. Once in place, the measurement probe can measure the width of the capture feature gap. A dial indicator provides a reading of the measurement.

Other objects, features and characteristics of the present invention will become apparent upon consideration of the following description and the appended claims with reference to the accompanying drawings, all of which form a part of the specification, and wherein like reference numerals designate corresponding parts in the various figures.

BRIEF DESCRIPTION OF THE DRAWINGS

FIG. 7 is a front plan view of the measurement apparatus of the present invention showing a handle and axial position indicator in accordance with the present invention; and FIG. 8 is a perspective view of a calibration block for the measurement apparatus of the present invention.

DETAILED DESCRIPTION OF THE INVENTION

Figure 1:
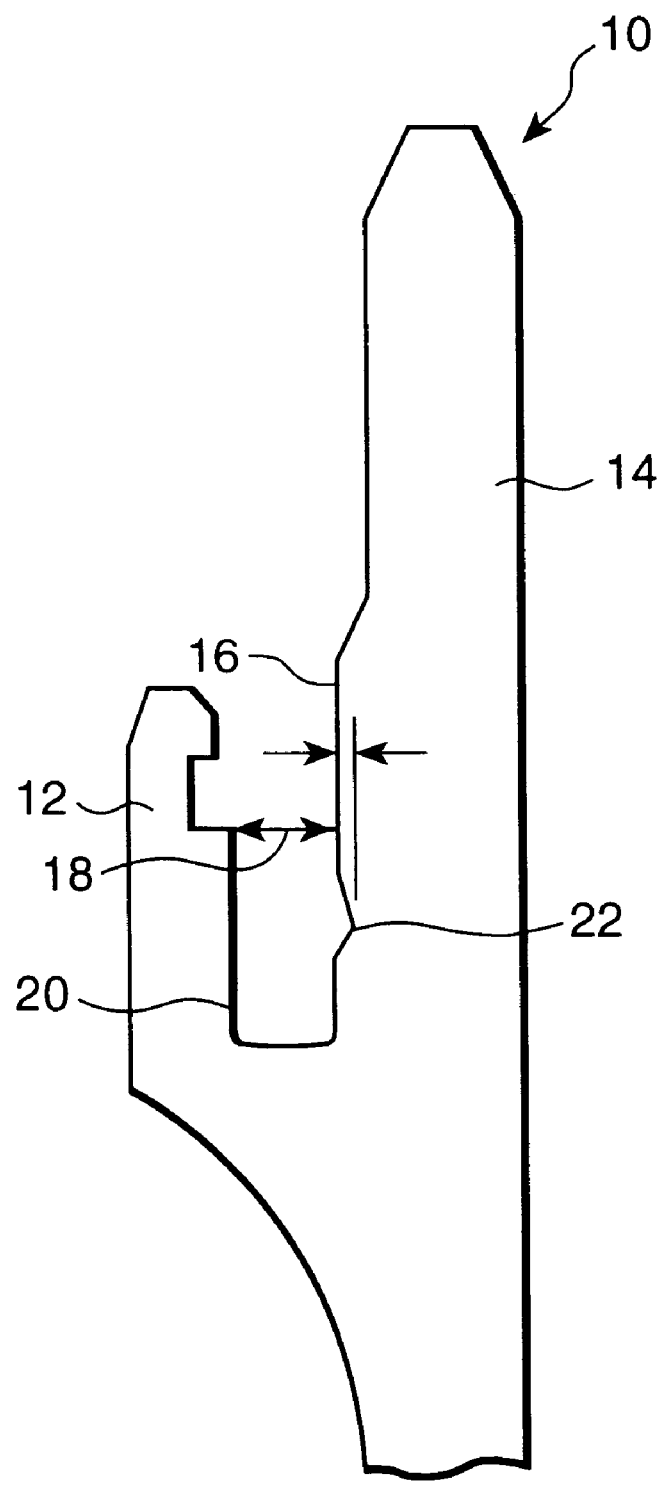
FIG. 1 is a sectional view of a tang joint portion of a rocket motor case field joint showing a capture feature gap.
Figure 2:
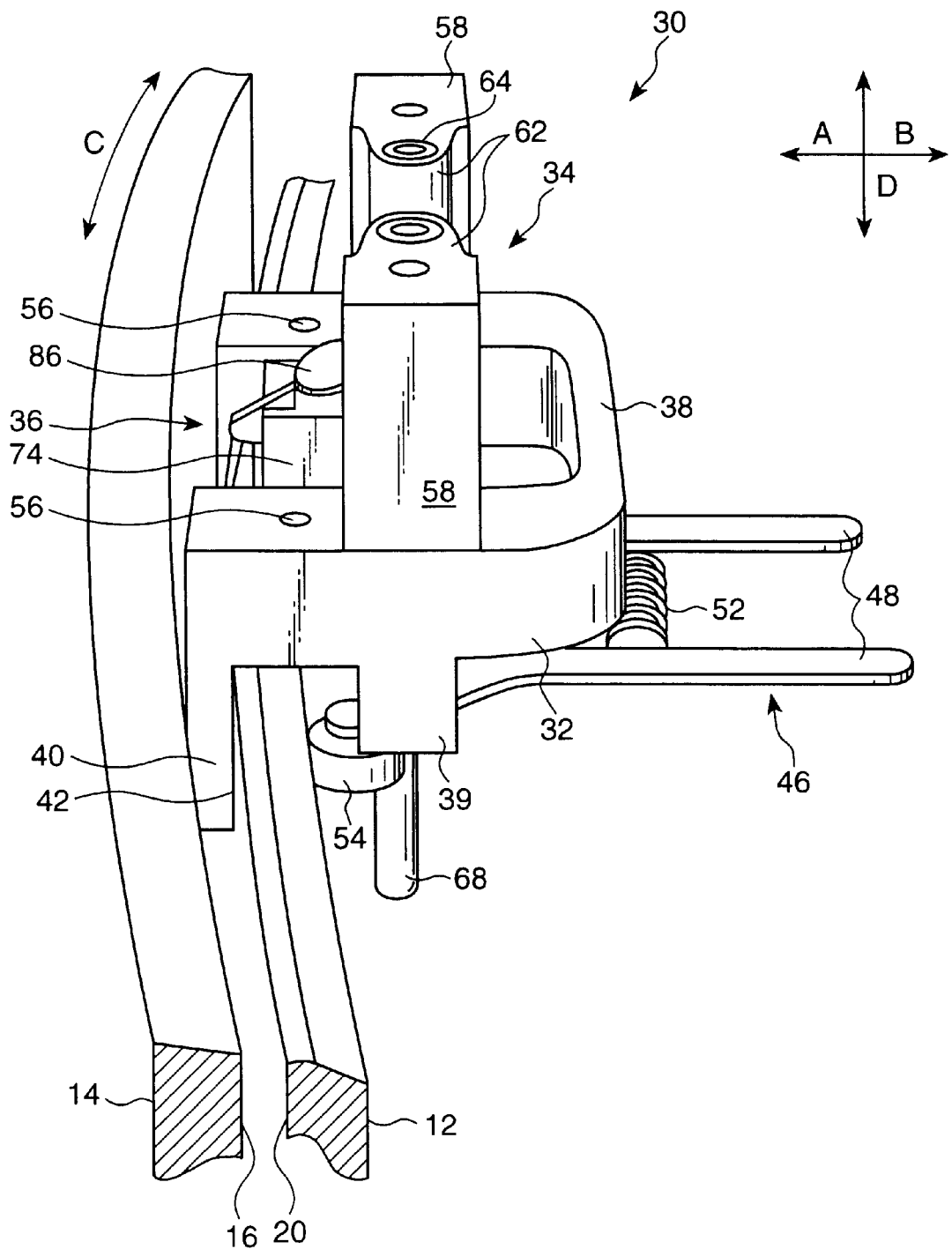
FIG. 2 is a perspective view of a measurement apparatus in accordance with the present invention for measuring seal defects on a seal surface of a rocket motor case field joint mounted to a tang joint of a rocket motor case field joint.
Figure 3:
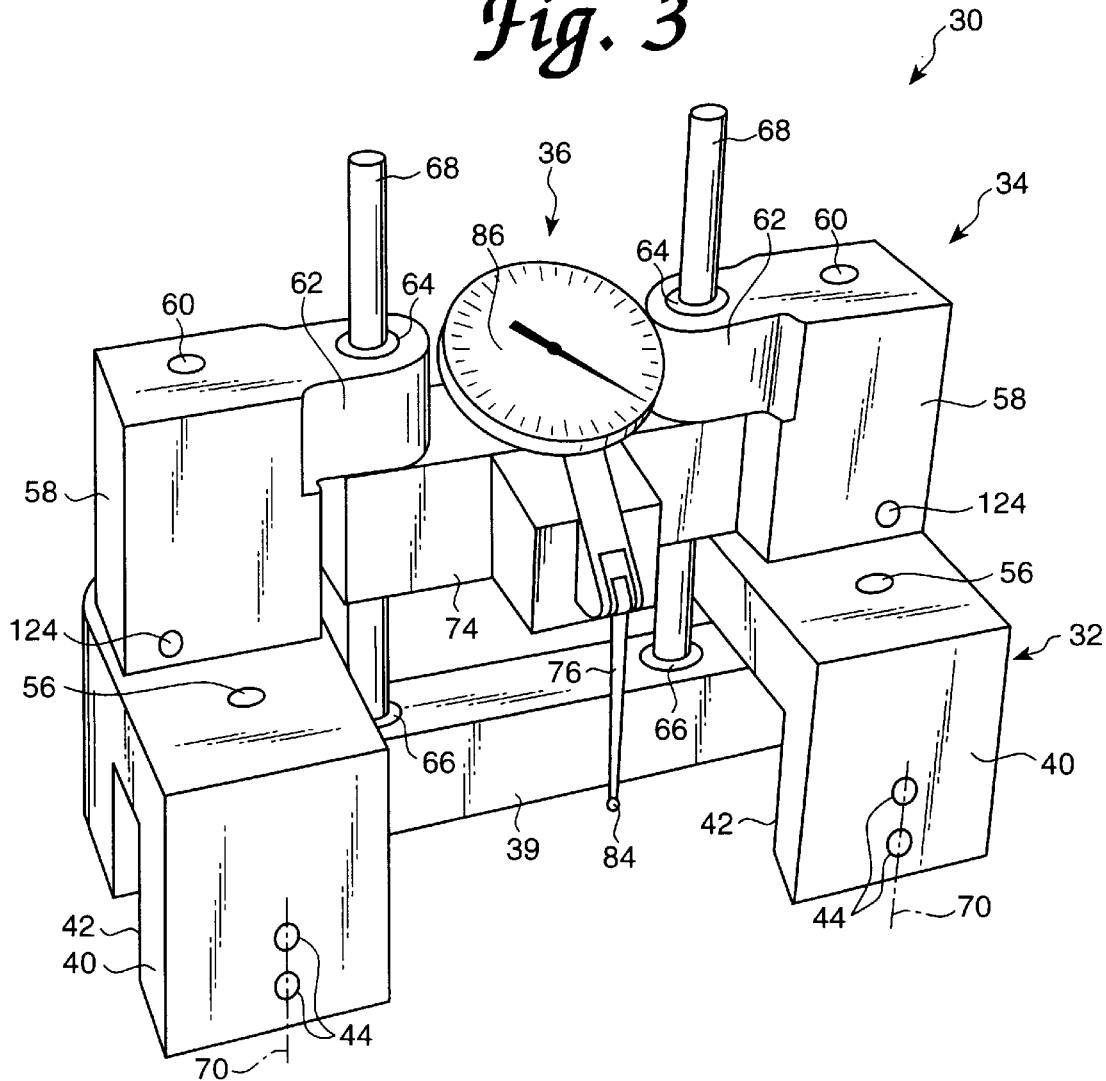
FIG. 3 is a front perspective view of the measurement apparatus of the present invention.
Figure 4:
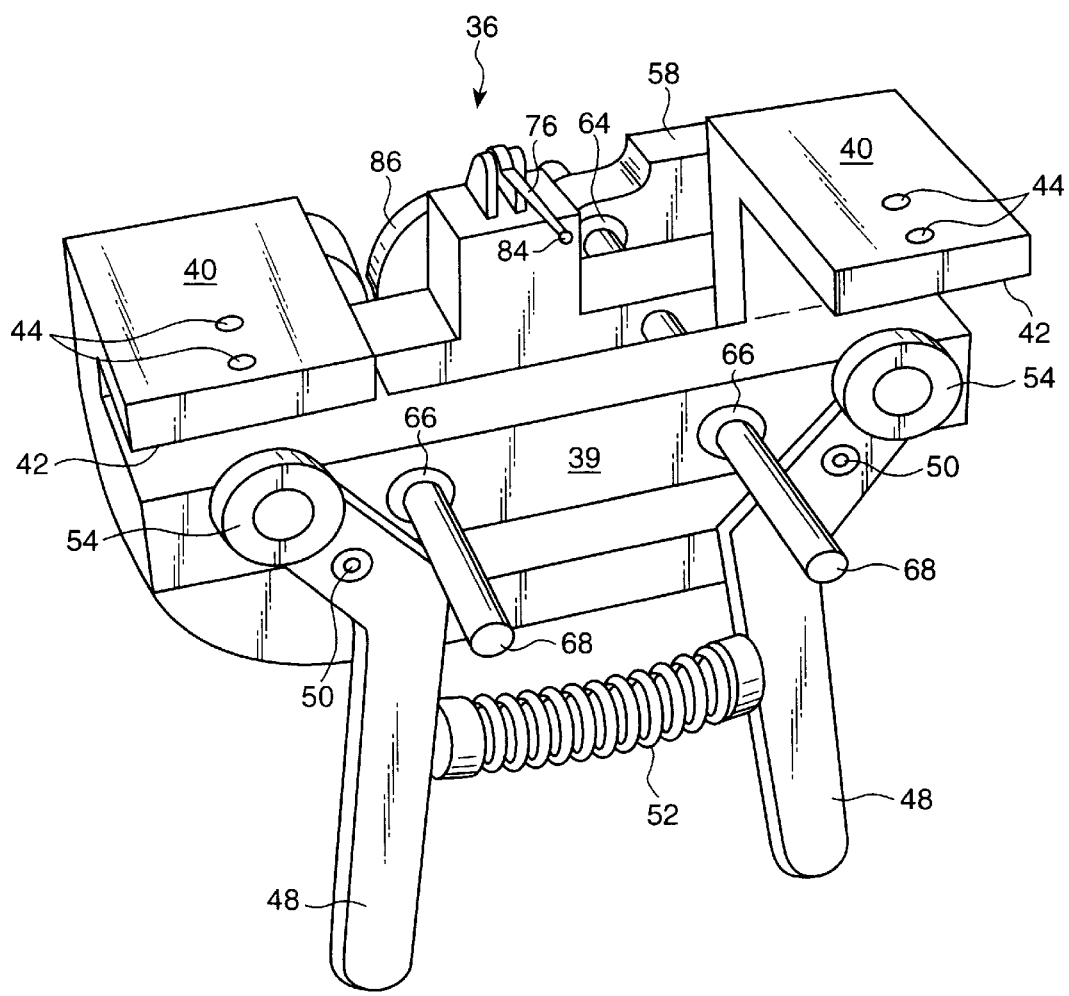
FIG. 4 is a bottom perspective view of the measurement apparatus of the present invention.

There shown in FIGS. 2–4, an apparatus for measuring seal defects on a seal surface of a rocket motor case field joint, generally indicated at 30, having the capability to directly measure the capture feature gap at any point on the seal surface of the rocket motor case field joint, including the capability to be swept both circumferentially and axially along the seal surface, in accordance with the principles of the present invention. The measurement apparatus 30 comprises a base 32, an axial sweeping mechanism 34, and a measurement probe 36.

For the following discussion, it is convenient to define the position of the structure of the measurement apparatus 30 relative to the axes of the rocket motor case field joint. As shown in FIG. 2, arrow A defines the radial outboard direction, while arrow B defines the radial inboard direction. The circumferential direction is defined by arrow C, while the axial direction is defined by arrow D.

As best seen in FIG. 2, the base 32 is configured to be mountable onto a known engineering datum surface 20 of a rocket motor case field joint. In the present embodiment, for example, the base 32 is mountable onto an interference fit diameter surface of a capture feature tang of a rocket motor case field joint. More particularly, the base 32 is configured to be mounted onto a known engineering datum surface 20 such that the base 32 is axially and radially fixed relative to the datum surface. With this configuration, the base 32, in effect, becomes an extension of the datum surface 20 and measurements between the datum surface 20 and the seal surface 16 can be made, or indexed, from the base 32.

In that regard, the base 32 includes a U-shaped portion 38. A lateral portion 39 is disposed laterally across an intermediate portion of the U-shaped portion 38. An indexing plate portion 40 is disposed from each end of the U-shaped portion 38 spaced from the lateral portion 39. The indexing plate portions 40 and the lateral portion 39 define a channel into which the capture feature 12 is placed. Each indexing plate portion 40 is configured, when the apparatus 30 is mounted to a rocket motor case field joint, to extend in an axial direction of the rocket motor. The base 32 is preferably constructed from aluminum.

As shown in FIG. 4, each indexing plate portion 40 includes a radially inwardly facing (i.e., facing toward the bottom of the "U" and facing toward the axial center of the rocket motor when mounted thereon) indexing surface 42. As shown in FIG. 2, each of the indexing surfaces 42 is configured to engage the engineering datum surface 20.

As shown in FIGS. 3 and 4, each indexing plate portion 40 includes indexing bearings 44 that extend inwardly beyond their respective indexing surface 42. When the apparatus 30 is mounted to the datum surface 20, the indexing bearings 44 engage the datum surface 20, thereby radially fixing the position of the base 32 relative the datum surface 20.

As shown in FIG. 4, the base 32 preferably includes two axially aligned bearings 44 per indexing plate portion 40, for a total of four bearings 44. When engaged against the datum surface 20, the four bearings 44 radially fix the position of the base 32 relative to the datum surface 20. Moreover, the incorporation of two bearings 44 on each indexing plate portion 40 prevents the base 32 from pivoting about an axis extending between the indexing plate portions 40. In other words, a four-point engagement is preferable over a three-point engagement and even more preferable over a two-point engagement. The indexing bearings 44 are configured to allow the base to roll along the circumferential datum surface 20. Suitable indexing bearings 44 include precision roller bearings provided by Stock Drive Products, model number S9912Y-1237PS2M, or their equivalent.

As best seen in FIG. 4, the base 32 also includes a pinch roller mechanism 46 configured to ensure that the indexing bearings 44 remain engaged with the datum surface 20, when the apparatus is mounted to a rocket motor case field joint. The pinch roller mechanism 46 includes a pair of lever arms 48 pivotally mounted to the lateral portion 39 of the base 32. Each lever arm 48 pivots about a point 50 disposed at an intermediate position between the ends of the lever arms 48. The inboard ends of the lever arms 48 (see discussion above and FIG. 2 for an understanding of inboard versus outboard) are biased by a spring 52 such that the inboard ends of the lever arms 48 pivot away from each other and the outboard ends of the lever arms 48 pivot toward each other. The pinch roller mechanism 46 also includes a pinch roller 54 rotatably disposed on each outboard end of the lever arms 48.

In use, an operator of the present apparatus would squeeze the inboard ends of the pinch roller mechanism 46, moving the inboard ends of the lever arms 48 toward each other against the biasing force of the spring 52. The movement of the inboard ends of the lever arms 48 increases the separation between each pinch roller 54 and the indexing surface 42. Once the indexing surface 42 is placed against the datum surface 20 (such that the indexing bearings 44 engage the datum surface 20), the operator releases the inboard ends of the lever arms 48. The biasing force of the spring 52 causes the pinch rollers 54 to engage the innermost surface of the capture feature 12 (see FIG. 2), thereby pulling the indexing bearings 44 of the indexing plate portions 40 into engagement with the datum surface 20. The pinch roller mechanism 46 assures that the indexing bearings 44 remain engaged upon the datum surface 20, while allowing the base 32 to move circumferentially along the datum surface 20. While the pinch roller mechanism 46 is the presently preferred method of securing the base 32 to the datum surface 20, one skilled in the art will readily recognize that other mechanisms could accomplish this feature.

The pinch rollers 54 must be circumferentially in-line or circumferentially inside of the indexing bearings 44 to prevent the base 32 from teetering. Moreover, the force of the pinch rollers 54 against the innermost surface of the capture feature 12 should be coplanar with the reaction force of the indexing bearings 44 to prevent a moment about the base 32 which would otherwise twist the base 32 out of alignment.

An axial indexing bearing 56 is preferably disposed at each end of the U-shaped portion 38 of the base 32 between the indexing plate portion 40 and the lateral portion 39. Each axial indexing bearing 56 extends below the surface of the U-shaped portion 38 and is configured to engage the top surface of the capture feature 12. This configuration ensures that the base 32 remains axially fixed relative to the datum surface 20 when the measurement apparatus is mounted to the rocket motor case field joint. The axial indexing bearings 56 are also configured to allow the base 32 to roll circumferentially around the top of the capture feature 12. A suitable axial indexing bearing 56 is a precision roller bearing provided by Stock Drive Products, model number S9912Y-255OPS2M, or its equivalent. As one skilled in the art will readily recognize, the roller bearing 56 is the presently preferred way of engaging the base 32 onto the top of the capture feature 12. Other mechanisms, including a low friction material like teflon, could be substituted without deviating from the present invention.

As shown in FIG. 3, to provide axial sweeping capability to the measurement apparatus, the axial sweeping mechanism 34 is disposed on the base 32. The axial sweeping mechanism 34 includes a pair of supporting members 58. In the present illustrated embodiment, the supporting members 58 are pillow blocks. The pillow blocks 58 are preferably constructed from aluminum. Each of the pillow blocks 58 define a bore 60 therethrough through which a bolt (not shown) passes and secures the pillow blocks 58 to each end of the U-shaped portion 38 of the base 32 in conventional fashion.

Each pillow block 58 includes a portion 62 extending circumferentially inwardly substantially along and above the lateral portion 39. The axial sweeping mechanism further includes a bushing bearing 64 disposed in each of the extended portions 62 and a pair of bushing bearings 66 disposed in the lateral portion 39 of the base 32. Each of the bushing bearings 64 disposed in the extended portion 62 is axially aligned with one of the bushing bearings 66 in the lateral portion 39. Finally, the axial sweeping mechanism 34 includes an axial sweeping member 68 movably disposed on the supporting member 58. In the present embodiment, the axial sweeping member 68 is a pair of linear shafts slidably disposed inside each of the aligned pair of bushing bearings 64, 66 such that each shaft 68 extends axially from one of the extended portions 62 through the lateral portion 39 of the base 32. A suitable bushing bearing 64, 66 is a linear bearing provided by Thomson Industries, model number XA 4812, or its equivalent. While the bushing bearings 64, 66 are the presently preferred method of allowing relative movement between the supporting member 58 and the axial sweeping member 68, one skilled in the art will readily recognize that other mechanisms could accomplish this feature.

As shown in FIG. 3, to ensure that the measurement apparatus 30 makes accurate measurements, the linear shafts 68 must be parallel with an axis 70 which extends through the axially aligned indexing bearings 44 on each of the indexing plate portions 40 of the base 32. In other words, the linear shafts 68 must be parallel with the datum surface 20 when the measurement apparatus 30 is mounted to a rocket motor case field joint.

Figure 5:
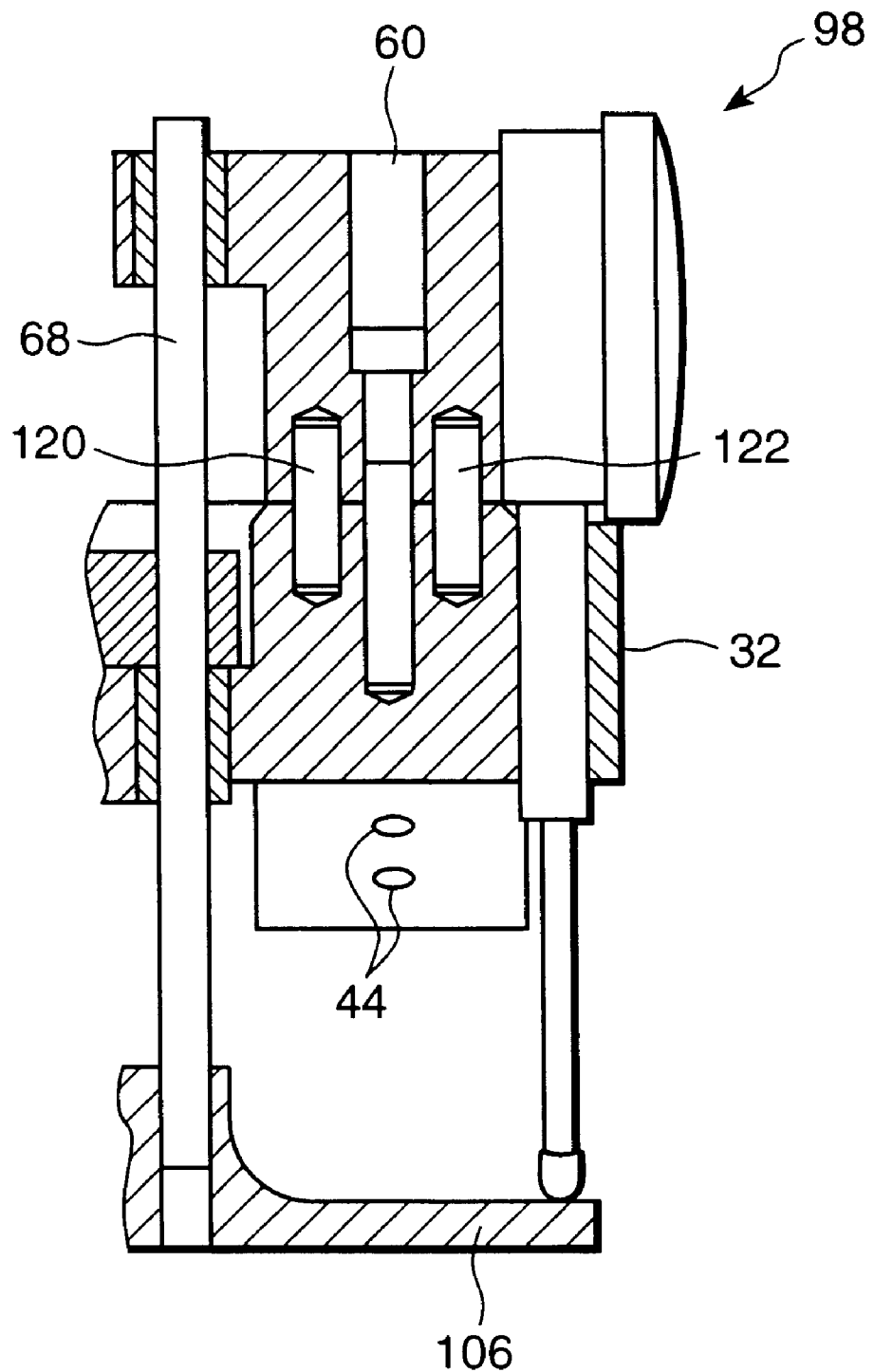
FIG. 5 is a sectional view of the measurement apparatus of the present invention.

To ensure this configuration, as shown in FIG. 5, the pillow blocks 58 can be pivoted about an inner pin 120 disposed inside the bore 60 in each of the pillow blocks 58 such that the extended portion 62 can be moved radially inwardly or outwardly. Each inner pin 120 is press fit and fixed into the base 32. Each pillow block 58 is pivotally disposed on respective inner pins 120. The bore 60 has a sufficiently large diameter that allows each pillow block 58 to move relative to the bolts when the pillow blocks 58 are pivoted about the inner pins 120. The position of each pillow block 58 is fixed to the base 32 by tightening each bolt.

The apparatus also preferably includes an outer pin 122 disposed outside the bore 60 in each of the pillow blocks 58. Each of the outer pins 122 fits into an outer bore in each of the pillow blocks 58 such that there is a several mil slip fit between the outer pins 122 and the pillow blocks 58. The slip fit between the outer pins 122 and the pillow blocks 58 ensures that the pillow blocks 58 are free to pivot about the inner pins 120. Two adjustment set screws 124 are disposed in each pillow bock on either side of the outer pin 122. The adjustment set screws 124 can be engaged upon the outer pins 122 to both fix the rotational position of the pillow blocks 58 and to move the pillow blocks to a defined position. This configuration ensures that the linear shafts 68 are confined to move along an axis parallel with the datum surface 20 but are otherwise radially fixed relative to the datum surface 20.

As shown in FIG. 7, the axial sweeping mechanism preferably includes a handle 72 mounted to an end of the linear shafts 68 to allow a user to move the shafts 68 together. The linear shafts 68 can be constructed from stainless steel, hardened steel or any other material that keeps the shafts 68 straight, for example, a precision ground shaft suitable for use with linear bearings.

Measurement of the capture feature gap 18 is achieved with the measurement probe 36. The measurement probe 36 includes a housing 74 fixed to the linear shafts 68 such that the housing 74 is confined to move with the linear shafts 68. More particularly, the housing 74 defines two bores (not shown) therethrough through which the linear shafts 68 pass. The housing 74 is fixed to the shafts 68 by conventional means including, for example, set screws.

Figure 6:
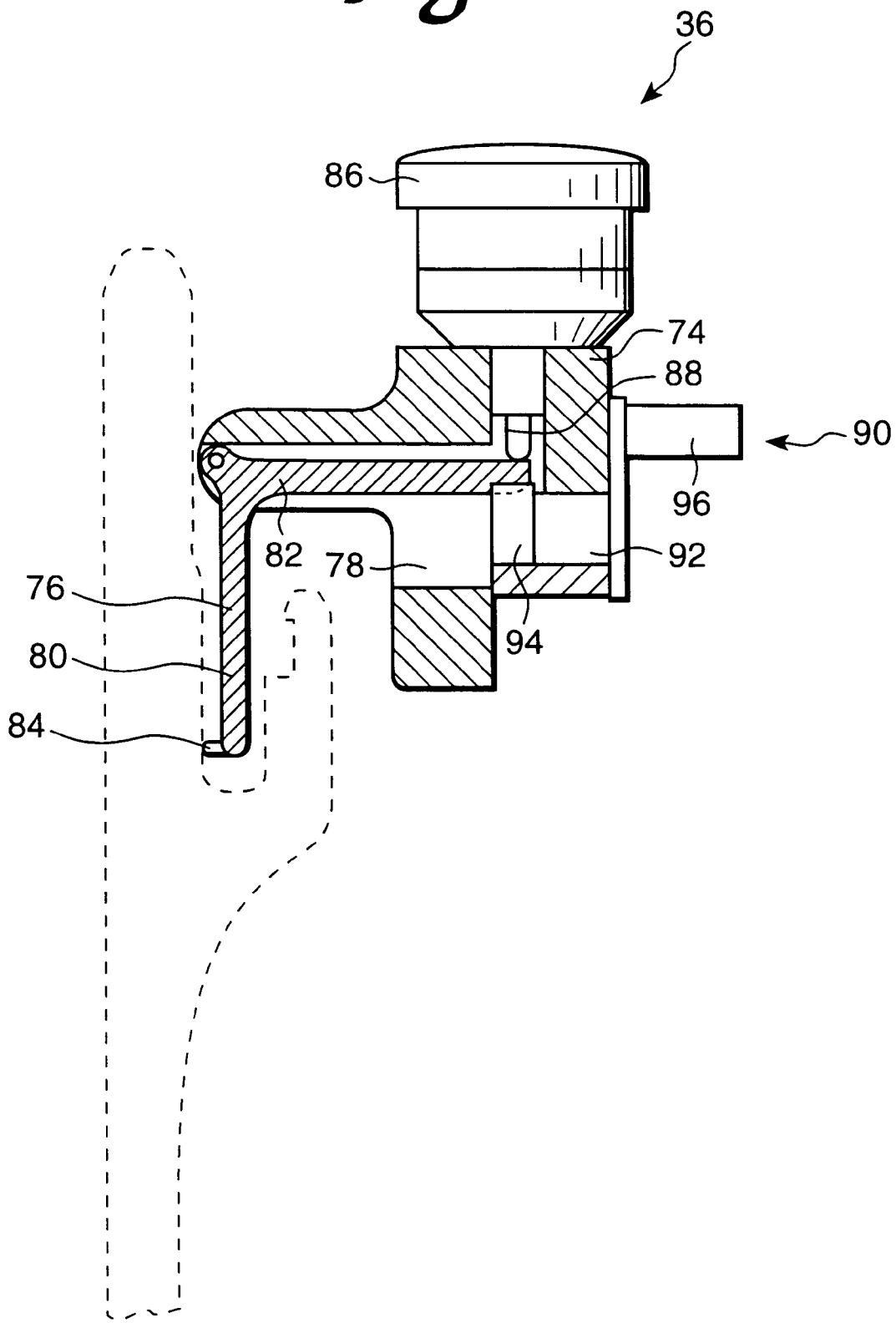
FIG. 6 is a sectional view of a measurement probe of the measurement apparatus of the present invention.

As shown in FIG. 6, the measurement probe 36 also includes an L-shaped rocker arm 76 pivotally mounted to the housing 74. More particularly, an intermediate portion of the rocker arm 76 is mounted to the housing 74 inside a cavity 78 defined by the housing 74 such that an axially extending portion 80 extends downwardly and a radially extending portion 82 extends radially inwardly. A measurement ball 84 is disposed on the tip of the axially extending portion 80.

The measurement probe 36 also includes a 90 degree dial indicator 86 of conventional style having a plunger 88 extending from the back side of the indicator 86. A suitable indicator is provided by the Standard Gage Co., model number D9-20121-G, or its equivalent. The dial indicator 86 is disposed on the housing 74 such that the plunger 88 extends into the cavity 78 and engages the end of the radially extending portion 82. The spring force of the plunger 88 causes the rocker arm 76 to pivot and to push the measurement ball 84 radially outwardly.

In use, the measurement probe 36 would be placed relative to a blend zone in a tang seal surface 16. The spring force of the plunger 88 would pivot the rocker arm 76 and force the measurement ball 84 against the surface of the blend zone. The radial movement of the measurement ball 84 (i.e., the depth of the blend zone) is transmitted as axial movement to the plunger 88 of the dial indicator 86 by the corresponding rotation of the radial extending portion 82 of the rocker arm 76. One skilled in the art will readily recognize that the radial movement of the measurement ball 84 into a blend zone is directly related to the axial displacement of the radially extending portion 82 of the rocker arm 76 only when the lengths of the radially extending portion 82 and the axially extending portion 80 are the same. In other words, to effect direct measurement of the depth of a blend zone, the length of the rocker arm 76 from the rocker arm pivot to the measurement ball 84 must be equal to the length of the rocker arm 76 from the rocker arm pivot to the point on the radially extending portion 82 which engages the plunger 88.

As shown in FIG. 6, the measurement probe 36 preferably includes a cam mechanism 90 for moving and holding the measurement ball 84 away from a position in which the measurement ball 84 would otherwise engage the seal surface 16. This feature is useful for preventing damage to the measurement ball 84 during nonuse. More particularly, the cam mechanism 90 includes a shaft 92 extending into the cavity 78 below the plunger 88 and the radially extending portion 82 of the rocker arm 76. A cam 94 is disposed on the end of the shaft 92 extending into the cavity. A handle 96 is disposed on the other end of the shaft 92 for turning the shaft 92 and the cam 94.

When an operator desires to lock the measurement ball 84 and rocker arm 76 out of an operative position, the handle 96 can be rotated until the cam 94 rotates into engagement with the end of the radially extending portion 82 of the rocker arm 76. In this position, the rocker arm 76 is locked, and the measurement ball 84 is held away from engagement with the seal surface 16. When the cam 94 is rotated free of the end of the radially extending portion 82 of the rocker arm 76, the plunger 88 pivots the rocker arm 76 back into an operative position.

The measurement apparatus also preferably includes an axial position indicator 98 for measuring the axial position of the measurement ball 84. As shown in FIG. 7, the axial position indicator 98 includes a dial indicator 100 having a travel of at least as long as the expected travel of the axial sweeping mechanism 34. The dial indicator 100 is disposed on a side of the base 32 such that a spring loaded plunger 102 of the dial indicator 100 extends axially downwardly. The dial indicator 100 is of conventional design.

The axial position indicator 98 also includes a plate 104 mounted to the ends of the linear shafts 68. The plate 104 includes a portion 106 that extends laterally beyond the side of the base 32. The plate and dial indicator 100 are configured such that the spring loaded plunger 102 engages the extended portion 106 of the plate 104. As the linear shafts 68 are raised or lowered, the plate 104 correspondingly raises or lowers the plunger 102 of the dial indicator 100 thereby providing an indication of the axial position of the measurement ball 84.

The axial position indicator 98 can be zeroed by placing the measurement ball 84 at a known axial position on the tang seal surface 16 (for example, the top of the tang seal surface 16 is a known distance from the top of the tang 14) and zeroing the indicator 98. Thereafter, the relative axial position of the measurement ball 84 can be read from the indicator 98.

The present apparatus also preferably includes an inspection light disposed in the base 32 configured to light the tang seal surface 16. The light is preferably a krypton inspection light or its equivalent. The inspection light highlights the seal defects that might otherwise be difficult to see by casting a shadow at the defect area.

The foregoing apparatus can be calibrated to directly measure the capture feature gap. In that regard, a calibration block 110 is provided. The calibration block 110 is preferably mounted to a plate 112. Handles 114 are disposed on the plate 112 providing a convenient method for carrying the block 110 and, when attached, the measurement apparatus 30.

More particularly, the calibration block 110 includes two datum surfaces 116 which simulate the engineering datum surface 20 of the rocket motor case field joint. The simulated datum surfaces 116 are disposed at each end of the calibration block 110. Moreover, the center of the first simulated datum surface 116 is spaced from the other surface at distance substantially equal to the separation between the indexing bearing axes 70. The foregoing spacing assures that the indexing bearings 44 engage the simulated surfaces 116 when the measurement apparatus 30 is mounted to the calibration block 110.

A simulated tang seal surface 118 is provided on the calibration block 110 radially spaced from the simulated datum surfaces 116 at a distance which simulates the capture feature gap of the rocket motor casing to be measured. As shown in FIG. 8, the plane defined by the simulated tang seal surface 118 is parallel to the plane defined by the simulated datum surfaces 116.

As discussed above, the separation between the simulated datum surfaces 116 and the simulated tang seal surface 118 must simulate the capture feature gap of the rocket motor casing to be measured. In the present embodiment, the surfaces of the calibration block are planar, while the datum and seal surfaces of the rocket motor casing are curved. Accordingly, the separation between the surfaces on the calibration block must be increased to compensate for the apparent increase in the capture feature gap caused by mounting the measurement apparatus 30 on the curved surface of the rocket motor casing to be measured. The degree of compensation will, of course, depend upon the degree of curvature of the rocket motor casing to be measured.

The following process is used to measure a capture feature gap with the measurement apparatus 30 of the present invention. Initially, the measurement apparatus is calibrated to the calibration block 110. Specifically, the measurement apparatus 30 is mounted onto the calibration block 110 by squeezing the lever arms 48 of the pinch roller mechanism 46 such that the rollers 54 separate from the indexing surface 42. Thereafter, the measurement apparatus 30 is placed on the calibration block 110 such that indexing bearing 44 engage the simulated datum surfaces 116, and the pinch roller mechanism 46 is released. Finally, with the measurement ball 84 engaged upon the simulated tang seal surface 118, the dial indicator 86 of the measurement probe 36 is zeroed. As calibrated, the measurement apparatus 30 will directly measure the depth of any blend zone.

Once calibrated, the measurement apparatus 30 can be mounted onto a capture feature 12 of the rocket motor casing to be measured. Specifically, the inboard ends of the lever arms 48 are squeezed toward each other against the biasing force of the spring 52, increasing the separation between each pinch roller 54 and the indexing surface 42. Thereafter, the indexing surface 42 is placed against the datum surface 20 (such that the indexing bearings 44 engage the datum surface 20) and the axial indexing bearing 56 is placed upon the top of the capture feature 12. After mounting, the lever arms 48 are released. The biasing force of the spring 52 causes the pinch rollers 54 to engage the innermost surface of the tang (see FIG. 2), thereby pulling the indexing plate portions 40 and indexing bearings 44 into engagement with the datum surface 20.

Once mounted, the base 32 can be moved circumferentially to the circumferential location of a blend zone to be measured. Thereafter, the linear shafts 68 are moved axially to position the measurement ball 84 in the axial position of the selected blend zone. The dial indicator 86 then reads out the depth of the selected blend zone.

While the invention has been described in connection with what is presently considered to be the most practical and preferred embodiment, it is to be understood that the invention is not limited to the disclosed embodiment. On the contrary, the present invention is intended to cover various modifications and equivalent arrangements included within the spirit and scope of the appended claims. Thus, it is to be understood that variations in the particular parameters used in defining the present invention can be made without departing from the novel aspects of this invention as defined in the following claims.

We claim:

1. An apparatus for measuring seal defects on a seal surface of a rocket motor case field joint; the apparatus comprising:

a base mountable onto a circumferential datum surface of the rocket motor case field joint at a position adjacent to the seal surface of the rocket motor case field joint, the base being constructed and arranged to be circumferentially movable along the circumferential datum surface while being axially and radially fixed relative to the datum surface;

an axial sweeping mechanism disposed on the base, the axial sweeping mechanism having a supporting member disposed on the base and an axial sweeping member movably disposed on the supporting member configured to move axially relative to the case field joint when the base is mounted to the datum surface, the axial sweeping mechanism being constructed and arranged to confine the axial sweeping member to move along an axis parallel with the datum surface such that the axial sweeping member is radially fixed relative to the datum surface; and a measurement probe fixed to the axial sweeping member, the measurement probe being constructed and arranged to measure the distance from the circumferential datum surface of the rocket motor case field joint to the seal surface of the rocket motor case field joint, wherein the measurement probe can measure the distance from any point on the seal surface to the datum surface when the measurement apparatus is mounted to the datum surface of the rocket motor case seal joint by circumferentially moving the base to a desired circumferential position and moving the axial sweeping member to a desired axial position.

* * * * *